(12) United States Patent
Röhr et al.

(10) Patent No.: US 10,697,347 B1
(45) Date of Patent: Jun. 30, 2020

(54) MIXER FOR AN EXHAUST SYSTEM OF AN INTERNAL COMBUSTION ENGINE

(71) Applicant: Eberspächer Exhaust Technology GmbH, Neunkirchen (DE)

(72) Inventors: Benjamin Röhr, Esslingen (DE);
Herve Tchamgoue, Bad Urach (DE);
Frank Berkemer, Eningen (DE)

(73) Assignee: Eberspächer Exhaust Technology GmbH, Neunkirchen (DE)

( * ) Notice: Subject to any disclaimer, the term of this patent is extended or adjusted under 35 U.S.C. 154(b) by 0 days.

(21) Appl. No.: 16/735,873

(22) Filed: Jan. 7, 2020

(30) Foreign Application Priority Data

Jan. 8, 2019 (DE) .................. 10 2019 100 267

(51) Int. Cl.
*F01N 13/18* (2010.01)
*F01N 13/08* (2010.01)
*F01N 3/20* (2006.01)

(52) U.S. Cl.
CPC ....... *F01N 13/1838* (2013.01); *F01N 13/082* (2013.01); *F01N 3/206* (2013.01)

(58) Field of Classification Search
CPC .... F01N 13/1838; F01N 13/082; F01N 3/206; F01N 2270/00; F01N 2270/08
See application file for complete search history.

(56) References Cited

U.S. PATENT DOCUMENTS

| | | | | | |
|---|---|---|---|---|---|
| 1,115,699 | A | * | 11/1914 | Loose | F02M 1/00 48/189.4 |
| 1,182,954 | A | * | 5/1916 | Wolf | B01F 5/0616 48/189.4 |
| 1,279,771 | A | * | 9/1918 | Snider | F02M 1/00 48/189.6 |
| 1,345,791 | A | * | 7/1920 | Livingstone | F02M 1/00 48/189.4 |
| 1,584,046 | A | * | 5/1926 | Smith | G05D 11/006 48/189.4 |

(Continued)

FOREIGN PATENT DOCUMENTS

| DE | 20 2012 011764 U1 | 1/2013 |
|---|---|---|
| DE | 10 2014 215 083 A1 | 2/2016 |

(Continued)

*Primary Examiner* — Hung Q Nguyen
(74) *Attorney, Agent, or Firm* — McGlew and Tuttle, P.C.

(57) ABSTRACT

An internal combustion engine exhaust system mixer includes a mixer body (12) with deflection elements (16) extending radially outwards from a mixer body center (14). A ring-shaped carrier area (22) adjoins the mixer body radially on the outside and encloses a mixer longitudinal axis. The carrier area includes a mixer connection area (24) for connecting the mixer (10) to an exhaust system component. A pipe connection wall (30) adjoins the mixer connection area and has a wall inner surface (32). A mixer body carrier wall (34) adjoins the mixer connection area, carries the mixer body, and is enclosed by the pipe connection wall. A first transition surface (40) adjoins the wall and is arched essentially continuously concavely between the wall inner surface and the wall outer surface, and axially defines a ring-shaped pipe-mounting intermediate space (38) between the pipe connection wall and the mixer body carrier wall.

20 Claims, 3 Drawing Sheets

(56) References Cited

U.S. PATENT DOCUMENTS

| | | | | | |
|---|---|---|---|---|---|
| 1,602,390 | A | * | 10/1926 | Butler | F02M 1/00 |
| | | | | | 48/189.4 |
| 2,886,945 | A | * | 5/1959 | Hofer | F01N 13/102 |
| | | | | | 60/321 |
| 2,913,871 | A | * | 11/1959 | Bradshaw | F01N 13/082 |
| | | | | | 239/399 |
| 3,016,692 | A | * | 1/1962 | Lapella | F01N 13/082 |
| | | | | | 417/171 |
| 4,339,918 | A | * | 7/1982 | Michikawa | F01N 13/082 |
| | | | | | 181/279 |
| 5,185,998 | A | | 2/1993 | Brew | |
| 7,556,031 | B2 | * | 7/2009 | Russell | B01F 5/061 |
| | | | | | 123/306 |
| 8,511,076 | B2 | * | 8/2013 | Wirth | B01F 3/04021 |
| | | | | | 60/317 |
| 9,534,525 | B2 | * | 1/2017 | Dalimonte | F01N 3/2066 |
| 2003/0226539 | A1 | * | 12/2003 | Kim | B01F 5/0618 |
| | | | | | 123/306 |
| 2007/0095057 | A1 | * | 5/2007 | Field | F01N 13/082 |
| | | | | | 60/317 |
| 2009/0165447 | A1 | | 7/2009 | Hiranuma et al. | |
| 2017/0074145 | A1 | * | 3/2017 | Silvis | B01F 5/04 |
| 2018/0100422 | A1 | | 4/2018 | Rohr et al. | |

FOREIGN PATENT DOCUMENTS

| | | | |
|---|---|---|---|
| DE | 10 2017 109908 A1 | 11/2017 | |
| DE | 10 2016 120 171 A1 | 4/2018 | |
| EP | 2 980 379 A1 | 2/2016 | |
| EP | 3 308 847 A1 | 4/2018 | |
| KR | 20140096709 A * | 8/2014 | ........... F01N 13/082 |

* cited by examiner

MIXER FOR AN EXHAUST SYSTEM OF AN INTERNAL COMBUSTION ENGINE

CROSS REFERENCE TO RELATED APPLICATIONS

This application claims the benefit of priority under 35 U.S.C. § 119 of German Application 10 2019 100 267.2, filed Jan. 8, 2019, the entire contents of which are incorporated herein by reference.

TECHNICAL FIELD

The present invention pertains to a mixer for an exhaust system of an internal combustion engine, comprising a mixer body with a plurality of flow deflection elements extending from a mixer body center radially outwards in relation to a mixer longitudinal axis as well as a carrier area, which adjoins the mixer body radially on the outside and encloses the mixer longitudinal axis in a ring-like manner.

TECHNICAL BACKGROUND

Such mixers are used in exhaust systems in order to bring about an efficient mixing of reactant, for example, a urea/water solution, which is injected into the exhaust gas stream farther upstream, with the exhaust gas discharged from the internal combustion engine. The mixer body is carried by the carrier area in relation to exhaust gas-carrying components of the exhaust system such that the exhaust gas flowing in the exhaust gas-carrying components can flow around the flow deflection elements thereof mixer body and the flow deflection elements can generate the swirling necessary for the mixing in the process.

SUMMARY

An object of the present invention is to embody a mixer for an exhaust system of an internal combustion engine with a configuration that can be embodied in a simple manner and is nevertheless stable under the thermal loads and mechanical stresses occurring during the combustion operation.

This object is accomplished according to the present invention by a mixer for an exhaust system of an internal combustion engine, comprising a mixer body with a plurality of flow deflection elements extending from a mixer body center radially outwards in relation to a mixer longitudinal axis as well as a carrier area, which adjoins the mixer body radially on the outside and encloses the mixer longitudinal axis in a ring-like manner, the carrier area comprising:
  a mixer connection area for connecting the mixer to an exhaust system component to be positioned adjoining the mixer,
  a pipe connection wall with a wall inner surface, which said pipe connection adjoins the mixer connection area,
  a mixer body carrier wall with a wall outer surface, which said carrier wall adjoins the mixer connection area, carries the mixer body and is enclosed by the pipe connection wall radially on the outside, and
  a first transition surface adjoining the wall outer surface and the wall inner surface, wherein the first transition surface is arched essentially continuously concavely between the wall inner surface and the wall outer surface and axially defines a ring-like (ring shaped) pipe-mounting intermediate space formed between the pipe connection wall and the mixer body carrier wall.

The two walls providing a connection to the mixer body, on the one hand, and an exhaust gas pipe, on the other hand, are connected to one another in the mixer configured according to the present invention such that corner or edge areas, which are subject to a high mechanical stress during the inevitably occurring thermal expansion of the mixer body and therefore show a tendency to cracking, are avoided by the essentially continuously concavely arched configuration in the transition, i.e., in the area of the first transition surface.

A configuration that avoids the development of excessively high local stresses even in the case of thermal expansion of the mixer body can be supported in an advantageous embodiment, for example, by a radius of curvature of the concavely arched first transition surface increasing from the junction of the first transition surface to the wall inner surface to the junction of the first transition surface to the wall outer surface. Provisions may be made in this connection, for example, for the radius of curvature to increase continuously, i.e., for there to be no areas with constant or decreasing radius of curvature. As an alternative, it is possible, for example, that, starting from the junction to the wall inner surface, a short area with decreasing radius of curvature is at first present, which is then followed by a long area with a radius of curvature increasing up to the junction to the wall outer surface. A constant radius of curvature may also be present in transition areas.

To make it possible to provide an even higher flexibility in the carrier area and also to make it possible to support flow guiding in a defined manner in the direction of the mixer body, it is proposed that a radial distance of the wall outer surface to the wall inner surface increase in the direction of an axially open end of the pipe-mounting intermediate space, which said end is located at a distance from the first transition surface. This can be achieved, for example, by the wall inner surface being a cylindrical surface, or/and by the wall outer surface being a frustoconical surface.

In the area in which the wall inner surface extends axially, the pipe connection wall may have an essentially constant wall thickness.

For a high flexibility of the mixer body carrier wall, on the one hand, and for a nevertheless stable connection of the mixer body carrier wall to the pipe connection wall or to the mixer connection area, on the other hand, provisions may be made for the mixer body carrier wall to have a first carrier wall area providing the wall outer surface on a radial outer side and a second carrier wall area adjoining the first carrier wall area and providing at least a part of the first transition surface, and for the mixer body carrier wall to have a constant wall thickness in the first carrier wall area or/and a wall thickness increasing in the direction away from the first carrier wall area in the second carrier wall area.

Such a structure, which also supports the flow guiding in the direction of the mixer body and the flow deflection elements thereof, can be achieved by the mixer body carrier wall having, in the second carrier wall area, on a second carrier wall area side facing away from the first transition surface, a second transition surface adjoining an inner circumferential surface of the mixer connection area and adjoining an inner circumferential surface of the first carrier wall area, and by the second transition surface having, in the area in which it extends between the inner circumferential surface of the mixer connection area and the inner circumferential surface of the first carrier wall area, no surface normal parallel to the mixer longitudinal axis or/and by a radial distance of the second transition surface to the mixer longitudinal axis decreasing continuously in its area in which it extends between the inner circumferential surface of the mixer connection area and the inner circumferential surface of the first carrier wall area or/and by a radial distance of the inner circumferential surface of the first carrier wall area to the mixer longitudinal axis decreasing axially away from the second transition surface.

Provisions may be made in this connection, for example, for the inner circumferential surface of the mixer connection area to be a cylindrical surface, or/and for the inner circumferential surface of the mixer connection area and the wall inner surface to be arranged radially offset in relation to one another, or/and for the inner circumferential surface of the first carrier wall area to be a frustoconical surface.

For a stable connection of the mixer configured according to the present invention with an exhaust system component adjoining it in an exhaust system especially upstream, which connection can be embodied in a simple manner, provisions may further be made for the mixer connection area to have a connection flange protruding radially outwards over the pipe connection wall with an essentially axially oriented contact surface for contact with an exhaust system component to be positioned adjoining the mixer. In case of such a configuration, the mixer connection area can be connected to the exhaust system component in a gas-tight manner, for example, with the use of a pipe clamp or the like, which encloses this mixer connection area and a complementary connection area of an exhaust system component.

The structural embodiment of the mixer configured according to the present invention makes it possible for the carrier area with its mixer connection area, with its pipe connection wall and with its mixer body carrier wall and for the mixer body with its mixer body center and with its flow deflection element to be configured as an integral cast metal part.

To make it possible to efficiently utilize the flexibility of the carrier area especially in the area of the mixer body carrier wall during a thermal expansion of the mixer body, which is brought about by the flow of exhaust gas around these areas, it is further proposed that at least some and preferably all of the flow deflection elements adjoin the mixer body carrier wall at an axial distance to the first transition surface.

A configuration leading to low stresses even under thermal load can further be achieved by a transition of the first transition surface into the wall inner surface and a transition of the first transition surface into the wall outer surface being arranged axially offset in relation to one another. Provisions may can be made in this case, in particular, for the transition of the first transition surface into the wall outer surface to be located axially farther away from an apex area of the first transition surface than the transition of the first transition surface into the wall inner surface.

The present invention further pertains to an exhaust system for an internal combustion engine, comprising a mixer configured according to the present invention.

An exhaust gas pipe, being in contact with the wall inner surface of the pipe connection wall, may be connected here to the pipe connection wall preferably by welding.

In order to make possible a radial movement of the mixer body carrier wall even when the exhaust gas pipe is connected to the pipe connection wall such that it is in contact with the wall inner surface, a radial distance between the wall inner surface of the pipe connection wall and the wall outer surface of the mixer body carrier wall may be greater than and preferably at least twice as great as a wall thickness of the exhaust pipe connected to the pipe connection wall.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
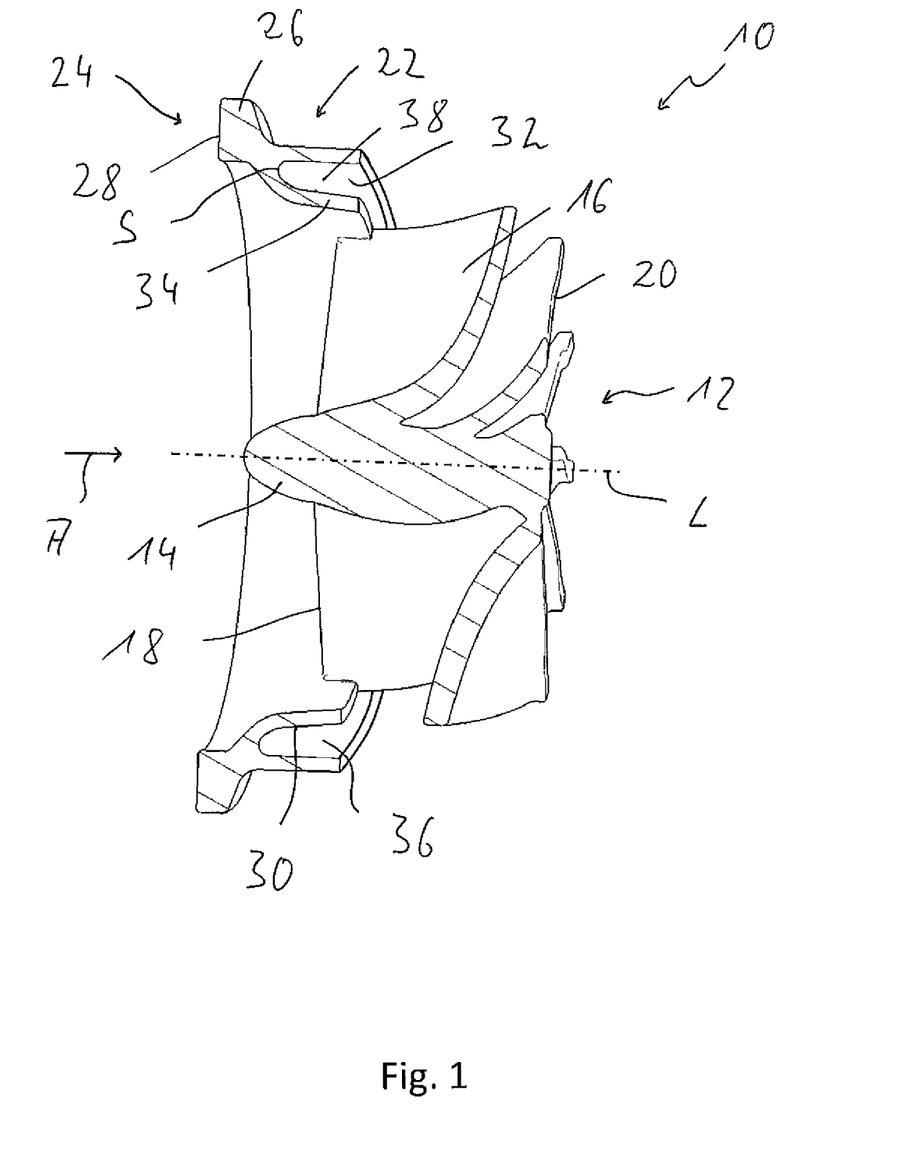
FIG. 1 is a perspective longitudinal sectional view of a mixer configured according to the present invention.

Referring to the drawings, a mixer for an exhaust system of an internal combustion engine is generally designated by 10 in FIG. 1. The mixer 10 comprises a mixer body 12 with a mixer body center 14 arranged, for example, centrally in relation to a mixer longitudinal axis L and with a plurality of blade shape flow deflection elements 16 originating from the mixer body center 14 or adjoining one another in the area of the mixer body center 14. The leading edges 18 of the flow deflection elements 16, which leading edges are oriented in the upstream direction, and the discharge edges 20 of the flow deflection elements 16, which discharge edges are oriented in the downstream direction or in the circumferential direction, are offset in relation to one another in the circumferential direction, so that the exhaust gas, which flows in an exhaust gas flow direction A towards the mixer 10 and is mixed with reactant, is deflected in the circumferential direction and swirled in the process while flowing through the mixer 10 or the mixer body 12. Efficient mixing of the exhaust gas with the reactant injected into same is achieved in the swirling flow thus generated. Further, the surfaces of the flow deflection elements 16, which surfaces are heated by the exhaust gas stream, contribute to supporting the evaporation of reactant impinging on them in the form of droplets.

Radially on the outside, the flow deflection elements 16 adjoin a carrier area of the mixer 10, which is generally designated by 22. The carrier area 22 provides a ring shaped enclosure of the mixer longitudinal axis L in a ring-shaped manner, i.e., it forms a ring that is closed in the circumferential direction. For connection of the mixer 10 to an exhaust system component positioned upstream in relation to the mixer 10, which connection will be described in detail below in reference to FIG. 3, the carrier area 22 has a mixer connection area 24. The mixer connection area 24 is configured with a radially outwards protruding connection flange 26 and with an essentially axially oriented contact surface 28, which is provided on this mixer connection area 24. The mixer connection area 24 can be positioned with the contact surface 28 for being in contact with the exhaust system component to be subsequently positioned upstream at the mixer 10.

Adjoining the mixer connection area 24, the carrier area 22 comprises a pipe connection wall 30 extending essentially in the direction of the mixer longitudinal axis L. An exhaust system component, especially an exhaust gas pipe, which is to be permanently connected to the mixer 10 and which hence adjoins this downstream, may be connected to the pipe connection wall 30. The pipe connection wall 30 has for this purpose a wall inner surface 32, which is configured essentially as a cylindrical surface and in contact with which the exhaust gas pipe to be permanently connected to the carrier area 22 can be positioned.

The carrier area 22 further comprises a mixer body carrier wall 34, which adjoins the mixer connection area 24 and also the pipe connection wall 30. The flow deflection elements 16 of the mixer body 12 adjoin the mixer body carrier wall 34 in the area of their leading edges 18. It should be noted that the entire mixer 10 with the mixer carrier area 22 and with the mixer body 12 may be manufactured as an integral cast metal part, i.e., as a metal block. If necessary, cutting machining operations may also be carried out following such a manufacturing operation carried out by casting, for example, in order to make the contact surface 28 perfectly flat for establishing a gas-tight connection.

The mixer body carrier wall 34 forms a radially outwards oriented wall outer surface 36. A pipe-mounting intermediate space 38 open in the downstream direction is formed between the wall inner surface 32 of the pipe connection wall 30 and the wall outer surface 36 of the mixer body carrier wall 34. This pipe-mounting intermediate space 38 is closed in the upstream direction by a first transition surface 40 formed essentially at the mixer body carrier wall 34. The first transition surface 40 adjoins the wall inner surface 32 in the area of a parting line $T_1$ shown in FIG. 2 and adjoins the wall outer surface 36 in the area of the parting line $T_2$ shown in FIG. 2. Starting from the parting line $T_1$ to the axial end area thereof, which is located at a distance from the mixer connection area 24, the pipe connection wall 30 has an essentially constant wall thickness, i.e., it has an outer circumferential surface 42 configured as a cylindrical surface in this area. The mixer body carrier wall 34 is likewise configured with an essentially constant wall thickness starting from the parting line $T_2$. It is seen that the radial distance between the pipe connection wall 30 and the mixer body carrier wall 34, and consequently essentially also the radial distance between the wall inner surface 32 and the wall outer surface 36, increase in the direction away from the first transition surface 40. To achieve this, it is possible, for example, to configure a first carrier wall area 44 of the mixer body carrier wall 34, which said carrier wall area 44 also forms essentially the wall outer surface, as a conically tapering wall area, so that the wall outer surface 36 as well as an inner circumferential surface 46 of the first carrier wall area 44 are configured as frustoconical surfaces.

Figure 2:
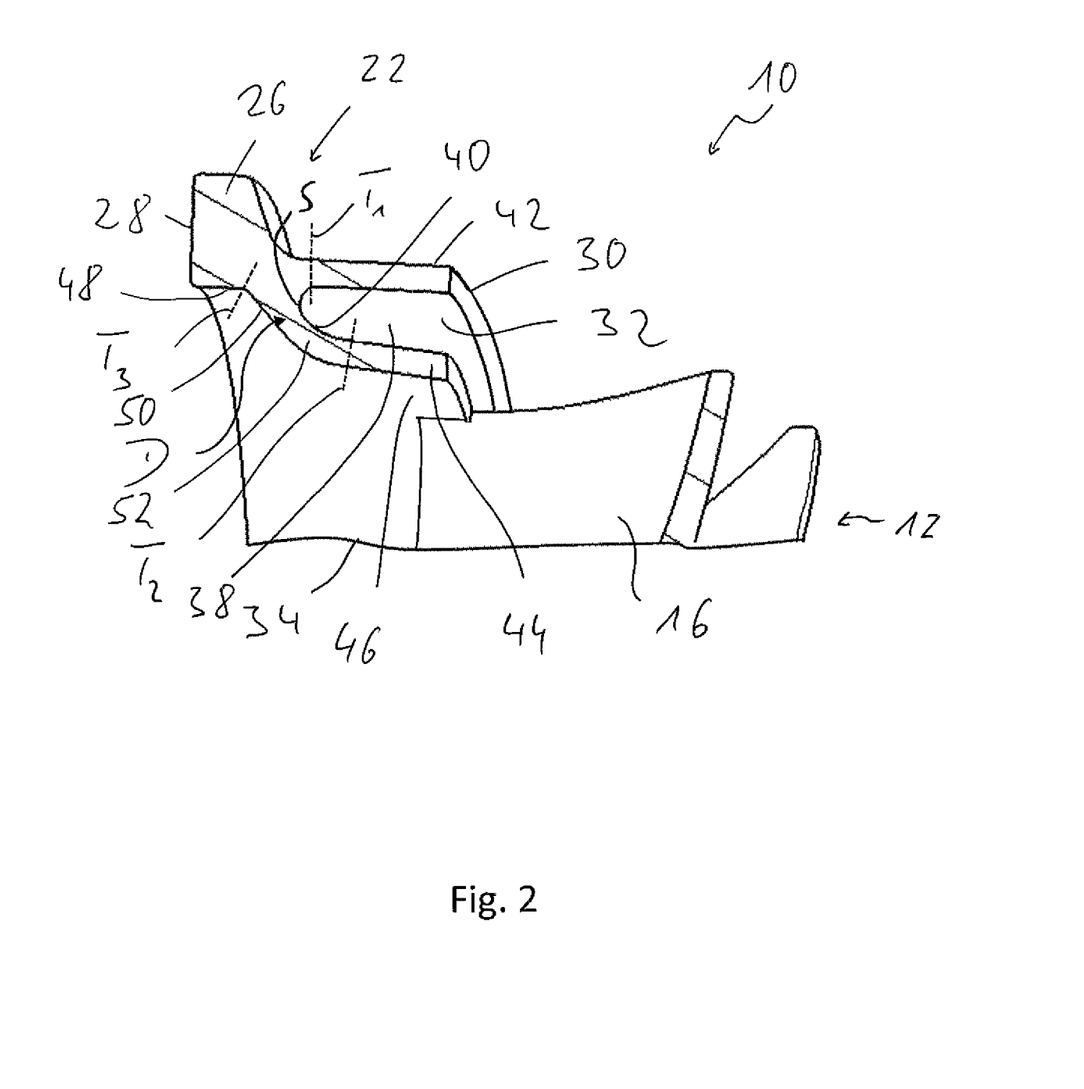
FIG. 2 is an enlarged detail sectional view of the mixer according to FIG. 1.

An inner circumferential surface 48 of the mixer connection area 24 is adjoined in the area of a parting line $T_3$ by a second transition surface 50, which extends, for example, to the parting line $T_2$. This second transition surface 50, which is oriented essentially radially inwards, is provided at a second carrier wall area 52 of the mixer body carrier wall 34 and is configured such that it does not have a surface normal parallel to the mixer longitudinal axis L in any of its areas located between the two parting lines $T_3$ and $T_2$. This means that at any point of the second transition surface 50, the surface normal of this surface has an extension component oriented in the radial direction in relation to the mixer longitudinal axis L. As a result, stepped transitions with radially extending surface areas are avoided between the inner circumferential surface 48 of the mixer connection area 24, which said inner circumferential surface is likewise configured as a cylindrical surface, and the inner circumferential surface 46 of the first carrier wall area 44. A curved, step-free transition is obtained, by which the exhaust gas mixed with reactant is also guided in the radially outer area in the direction of the flow deflection elements 16 without a substantial flow resistance.

The first transition surface 40 has a continuously concave configuration in the mixer 10 between the area in which the first transition surface adjoins the wall inner surface 32 at the parting line $T_1$ and the area in which it adjoins the wall outer surface 36 at the parting line $T_2$, so that the second carrier wall area 52 forms with this concavely arched first transition surface 40 a correspondingly concavely arched bottom area of the pipe-mounting intermediate space 38, which bottom area extends around the mixer longitudinal axis L in the circumferential direction in a ring-like manner. Further, the first transition surface 40 is configured in an especially advantageous embodiment such that in its concave shape, the radius of curvature increases starting from the parting line $T_1$, i.e., the area in which the first transition surface 40 adjoins the wall inner surface 32, to the area in which the first transition surface 40 adjoins the wall outer surface 36 at the parting line $T_2$. The increase may especially advantageously be continuous, so that there is essentially no area with constant or decreasing radius of curvature between the parting lines $T_1$ and $T_2$. In conjunction with the shape of the second transition surface 50, a wall thickness is thus obtained for the second carrier wall area 52 that increases starting from the parting line $T_2$, i.e., the junction to the first carrier wall area 44, to the area in which the second carrier wall area 52 adjoins the mixer connection area 24 or the pipe connection wall 30. There preferably is no kink-type or stepped transition either at the transition of the second carrier wall area 52 to the mixer connection area 24 or to the inner circumferential surface 48 thereof or at the transition of the second carrier wall area 52 to the pipe connection wall 30 or to the wall inner surface 32 thereof. Further, the area in which the first transition surface 40 passes over into the wall outer surface 36 at the line $T_2$ is axially offset in relation to the area in which the first transition surface 40 passes over into the wall inner surface 32 at the line $T_1$, such that the transition at the line $T_2$ is located axially at a greater distance from an apex area S of the first transition surface 40 than the transition at the line $T_1$. A gradual, step-free or kink-free transition of the first transition surface 40 into the wall outer surface 36 is supported hereby. It should be noted that the apex area S of the first transition surface 40 is the area in which this first transition surface 40 has a maximum distance from the axial end surfaces of the pipe connection wall 30 and of the mixer body carrier wall 34, which axial end surfaces are shown in the right-hand part of FIG. 2.

It can clearly be seen in FIG. 1 that the flow deflection elements 16 adjoin the mixer body carrier wall 34 such that deflection areas oriented most upstream, i.e., the leading edges 18, are located at an axially spaced location from the first transition surface 40, especially from the area in which this transition surface 40 passes over into the wall outer surface 36 at the parting line $T_2$. The mixer body 12 will undergo thermal expansion during the flow of hot exhaust gas discharged from an internal combustion engine around the mixer 10. The mixer body carrier wall 34 can follow this radial expansion of the mixer body 12 during this thermal expansion based on the shape of the carrier area 22, on the one hand, and based on the fact that the flow deflection elements 16 adjoin the mixer body carrier wall 34 with an axial offset in relation to the first transition surface 40. The second carrier wall area 52 essentially forms a fulcrum or hinge point in area D thereof since no corners, edges or steps are present in any area of the different surfaces passing one over into another, the development of an excessively high local stress is avoided in this manner during the radial expansion of the mixer body 12. Further, this radial expansion movement is not compromised by any sections of the carrier area 22 based on the comparatively great radial distance between the pipe connection wall 30 and the mixer body carrier wall 34.

Figure 3:
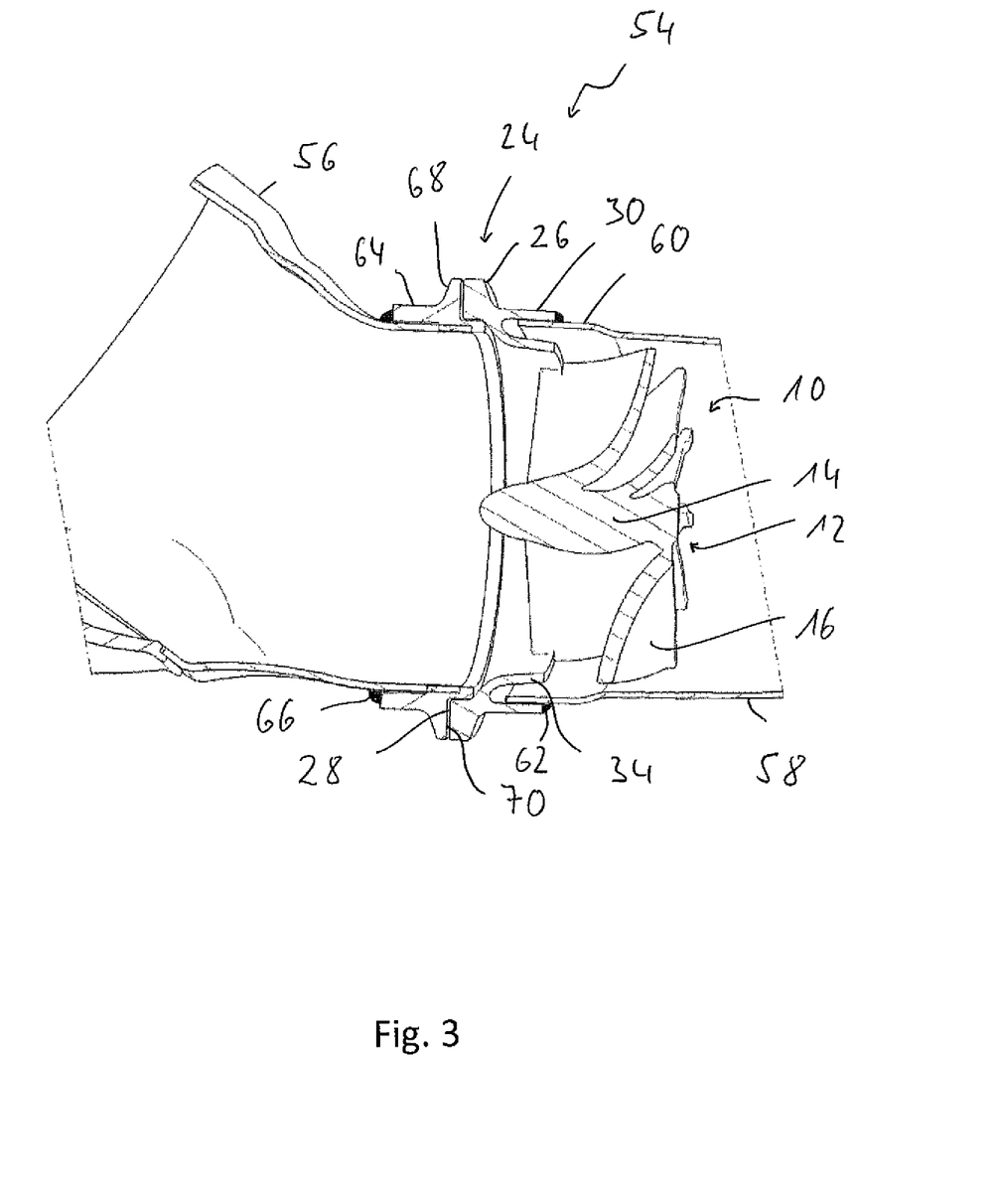
FIG. 3 is a longitudinal sectional view of a part of an exhaust system of an internal combustion engine, which part contains a mixer according to FIG. 1.

FIG. 3 shows the integration of the mixer 10 into an exhaust system of an internal combustion engine, which exhaust system is generally designated by 54. This exhaust system 54 comprises an upstream exhaust gas pipe 56, in the area of which, for example, an injector, intended for injecting the reactant, may be arranged. The exhaust system 54 further comprises a downstream exhaust gas pipe 58, which is inserted with an end area 60, which is somewhat widened, for example, radially, into the pipe-mounting intermediate space 38 of the mixer 10 such that it is in contact with the wall inner surface 32. The exhaust gas pipe 58 is connected to the pipe connection wall 30 by connection in substance by a weld seam 62 extending preferably in the circumferential direction.

A connection element 64 having a shape complementary to that of the pipe connection area 24 of the mixer 10 is fixed at the exhaust gas pipe 56 positioned upstream in relation to the mixer 10, for example, by a weld seam 66. The connection element 64 has a flange area 68 complementary to the flange area 26 of the mixer connection area 24, which flange area 26 protrudes radially outwards over the pipe connection wall 30. The flange area 26 is positioned with its contact surface 28 opposite a contact surface 70 of the flange area 68, and, for example, a ring-like sealing element may be positioned, for example, between these two contact surfaces 28, 70. A pipe clamp or the like, which encloses the two flange areas 26, 68 in the radially outward direction and also extends radially over same, and by means of which a gas-tight, permanent bond of the mixer connection area 24 to the connection element 64 is achieved, may be provided for a permanent connection. For example, bolts may be passed through the two flange areas 26, 68 in an alternative embodiment in order to guarantee a stable bond.

A shape that makes a thermal expansion of the mixer body possible without the development of excessively high local stresses is obtained with the above-described configuration of a mixer, which can be provided as an integral, i.e., one-piece component or as a component formed from a block of material. Thus, not even a large number of expansion cycles occurring over the service life of such a mixer will lead to the risk of development of cracks that could lead to a separation of the mixer body from the carrier area in the area of high local stresses.

It should be noted that many different variations are possible in the above-described mixer, which is shown in the figures, without abandoning the above-described essential configuration principle of this mixer. It is thus possible, for example, not to arrange the inner circumferential surface of the mixer connection area offset radially inwards in relation to the wall inner surface, but to arrange it, for example, at the same radial level or offset radially outwards in relation to this wall inner surface. While maintaining the principle of an essentially continuously concave shape, the first transition surface may also be configured locally, for example, with constant radius of curvature between the areas in which the first transition surface adjoins the wall inner surface and the wall outer surface, or the radius of curvature of the first transition surface could first decrease, for example, starting from the area in which the first transition surface adjoins the wall inner surface, for example, up to an area close to or to the apex area of the first transition surface, in order then to increase again in the direction of the wall outer surface. The flow deflection elements may, of course, also be arranged with a shape or positioning in relation to the mixer body center that is different from the shape shown.

While specific embodiments of the invention have been shown and described in detail to illustrate the application of the principles of the invention, it will be understood that the invention may be embodied otherwise without departing from such principles.

What is claimed is:

1. An internal combustion engine, exhaust system mixer comprising:
   a mixer body with a plurality of flow deflection elements extending radially outwards from a mixer body center portion in relation to a mixer longitudinal axis; and
   a carrier area, which adjoins the mixer body radially on an outside and has a ring-shape enclosing the mixer longitudinal axis, the carrier area comprising:
   a mixer connection area for connecting the mixer to an exhaust system component to be positioned adjoining the mixer;
   a pipe connection wall with a wall inner surface, the pipe connection wall adjoining the mixer connection area;
   a mixer body carrier wall with a wall outer surface, which mixer body carrier wall adjoins the mixer connection area, carries the mixer body and is enclosed by the pipe connection wall radially on an outside; and
   a transition surface, which adjoins the wall outer surface and the wall inner surface, wherein the transition surface is arched essentially continuously concavely between the wall inner surface and the wall outer surface and axially defines a ring-shaped pipe-mounting intermediate space formed between the pipe connection wall and the mixer body carrier wall.

2. An internal combustion engine, exhaust system mixer in accordance with claim 1, wherein a radius of curvature of the concavely arched transition surface increases from a junction of the transition surface to the wall inner surface to a junction of the first transition surface to the wall outer surface.

3. An internal combustion engine, exhaust system mixer in accordance with claim 1, wherein a radial distance of the wall outer surface to the wall inner surface increases in a direction of an axially open end of the pipe-mounting intermediate space, which axially open end is located at a distance from the transition surface.

4. An internal combustion engine, exhaust system mixer in accordance with claim 1, wherein:
   the wall inner surface is a cylindrical surface; or
   the wall outer surface is a frustoconical surface; or
   the wall inner surface is a cylindrical surface and the wall outer surface is a frustoconical surface.

5. An internal combustion engine, exhaust system mixer in accordance with claim 1, wherein the pipe connection wall has an essentially constant wall thickness in an area in which the wall inner surface extends axially.

6. An internal combustion engine, exhaust system mixer in accordance with claim 1, wherein:
   the mixer body carrier wall has a first carrier wall area forming the wall outer surface on a radial outer side and a second carrier wall area, which adjoins the first carrier wall area and forms at least a part of the first transition surface, and the mixer body carrier wall has a constant wall thickness in the first carrier wall area or the mixer body carrier wall has a wall thickness increasing in the direction away from the first carrier wall area in the second carrier wall area or the mixer body carrier wall has a constant wall thickness in the first carrier wall area and the mixer body carrier wall has a wall thickness increasing in the direction away from the first carrier wall area in the second carrier wall area.

7. An internal combustion engine, exhaust system mixer in accordance with claim 6, wherein:

the transition surface is a first transition surface;

in the second carrier wall area, the mixer body carrier wall has, on a side facing away from the first transition surface, a second transition surface adjoining an inner circumferential surface of the mixer connection area and an inner circumferential surface of the first carrier wall area; and the second transition surface has no surface normal parallel to the mixer longitudinal axis in an area in which the second transition surface extends between the inner circumferential surface of the mixer connection area and the inner circumferential surface of the first carrier wall area or a radial distance of the second transition surface to the mixer longitudinal axis decreases continuously in an area in which the second transition surface extends between the inner circumferential surface of the mixer connection area and the inner circumferential surface of the first carrier wall area or a radial distance of the inner circumferential surface of the first carrier wall area to the mixer longitudinal axis decreases in the direction away from the second transition surface or any combination of the second transition surface has no surface normal parallel to the mixer longitudinal axis in an area in which the second transition surface extends between the inner circumferential surface of the mixer connection area and the inner circumferential surface of the first carrier wall area and a radial distance of the second transition surface to the mixer longitudinal axis decreases continuously in an area in which the second transition surface extends between the inner circumferential surface of the mixer connection area and the inner circumferential surface of the first carrier wall area and a radial distance of the inner circumferential surface of the first carrier wall area to the mixer longitudinal axis decreases in the direction away from the second transition surface.

8. An internal combustion engine, exhaust system mixer in accordance with claim 7, wherein:

the inner circumferential surface of the mixer connection area is a cylindrical surface; or the inner circumferential surface of the mixer connection area and the wall inner surface are arranged radially offset in relation to one another; or the inner circumferential surface of the first carrier wall area is a frustoconical surface; or any combination of the inner circumferential surface of the mixer connection area is a cylindrical surface, and the inner circumferential surface of the mixer connection area and the wall inner surface are arranged radially offset in relation to one another, and the inner circumferential surface of the first carrier wall area is a frustoconical surface.

9. An internal combustion engine, exhaust system mixer in accordance with claim 1, wherein the mixer connection area has a connection flange protruding radially outwards over the pipe connection wall with an essentially axially oriented contact surface for contacting the exhaust system component to be positioned adjoining the mixer.

10. An internal combustion engine, exhaust system mixer in accordance with claim 1, wherein the carrier area with each of the mixer connection area, the pipe connection wall, the mixer body carrier wall and the mixer body with mixer body center portion and flow deflection elements is configured as an integral cast metal part.

11. An internal combustion engine, exhaust system mixer in accordance with claim 1, wherein at least some of the flow deflection elements adjoin the mixer body carrier wall spaced an axial distance to the transition surface.

12. An internal combustion engine, exhaust system mixer in accordance with claim 1, wherein a transition of the transition surface into the wall inner surface and a transition of the transition surface into the wall outer surface are located axially offset in relation to one another.

13. An internal combustion engine, exhaust system mixer in accordance with claim 12, wherein the transition of the transition surface into the wall outer surface is located axially at a greater distance from an apex area of the transition surface than the transition of the transition surface into the wall inner surface.

14. An exhaust system for an internal combustion engine, the exhaust system comprising a mixer, the mixer comprising:

a mixer body with a plurality of flow deflection elements extending radially outwards from a mixer body center portion in relation to a mixer longitudinal axis; and a carrier area, which adjoins the mixer body radially on an outside and has a ring-shape enclosing the mixer longitudinal axis, the carrier area comprising:

a mixer connection area for connecting the mixer to an exhaust system component to be positioned adjoining the mixer;

a pipe connection wall with a wall inner surface, the pipe connection wall adjoining the mixer connection area;

a mixer body carrier wall with a wall outer surface, which mixer body carrier wall adjoins the mixer connection area, carries the mixer body and is enclosed by the pipe connection wall radially on an outside; and a transition surface, which adjoins the wall outer surface and the wall inner surface, wherein the transition surface is arched essentially continuously concavely between the wall inner surface and the wall outer surface and axially defines a ring-shaped pipe-mounting intermediate space formed between the pipe connection wall and the mixer body carrier wall.

15. An exhaust system in accordance with claim 14, further comprising an exhaust gas pipe located adjoining the wall inner surface of the pipe connection wall and connected to the pipe connection wall.

16. An exhaust system in accordance with claim 15, wherein a radial distance between the wall inner surface of the pipe connection wall and the wall outer surface of the mixer body carrier wall is greater than a wall thickness of the exhaust gas pipe connected to the pipe connection wall.

17. An exhaust system in accordance with claim 15, wherein a radius of curvature of the concavely arched transition surface increases from a junction of the transition surface to the wall inner surface to a junction of the first transition surface to the wall outer surface.

18. An exhaust system in accordance with claim 15, wherein a radial distance of the wall outer surface to the wall inner surface increases in a direction of an axially open end of the pipe-mounting intermediate space, which axially open end is located at a distance from the transition surface.

19. An exhaust system in accordance with claim 15, wherein:
- the wall inner surface is a cylindrical surface; or
- the wall outer surface is a frustoconical surface; or
- the wall inner surface is a cylindrical surface and the wall outer surface is a frustoconical surface.

20. An exhaust system in accordance with claim 14, wherein:
- the pipe connection wall has an essentially constant wall thickness in an area in which the wall inner surface extends axially; and
- the mixer connection area has a connection flange protruding radially outwards over the pipe connection wall with an essentially axially oriented contact surface that is in contact with the exhaust gas pipe.

\* \* \* \* \*